United States Patent [19]
Lubbers et al.

[11] 3,825,342
[45] July 23, 1974

[54] COMPUTING TYPE OPTICAL ABSORPTION MIXTURE ANALYZER

[75] Inventors: Dietrich Werner Lubbers, Dortmund; Reinhard Wodick, Dortmund-Loh; Dieter Piroth, Dortmund-Barup, all of Germany

[73] Assignee: Max-Planck-Gesellschaft zur Forderung der Wissenschaften e. V., Gottingen, Germany

[22] Filed: May 8, 1972

[21] Appl. No.: 251,538

[30] Foreign Application Priority Data
May 7, 1971 Germany.............................. 2122655

[52] U.S. Cl..................................... 356/41, 356/186
[51] Int. Cl. .............................................. G01n 33/16
[58] Field of Search ......... 356/39, 40, 41, 179, 186, 356/205, 206, 180, 184

[56] References Cited
UNITED STATES PATENTS
3,638,640  2/1972  Shaw...................................... 356/41

Primary Examiner—John K. Corbin
Assistant Examiner—Conrad Clark
Attorney, Agent, or Firm—William R. Woodward; Flynn & Frishauf

[57] ABSTRACT

The proportional concentration of a given substance in a mixture of substances, e.g. the specific oxyhaemoglobin content of blood, is determined by an apparatus which measures the absorption, by the mixture, of electromagnetic radiation, as light, at three specific wavelength and calculates and indicates the desired concentration.

9 Claims, 1 Drawing Figure

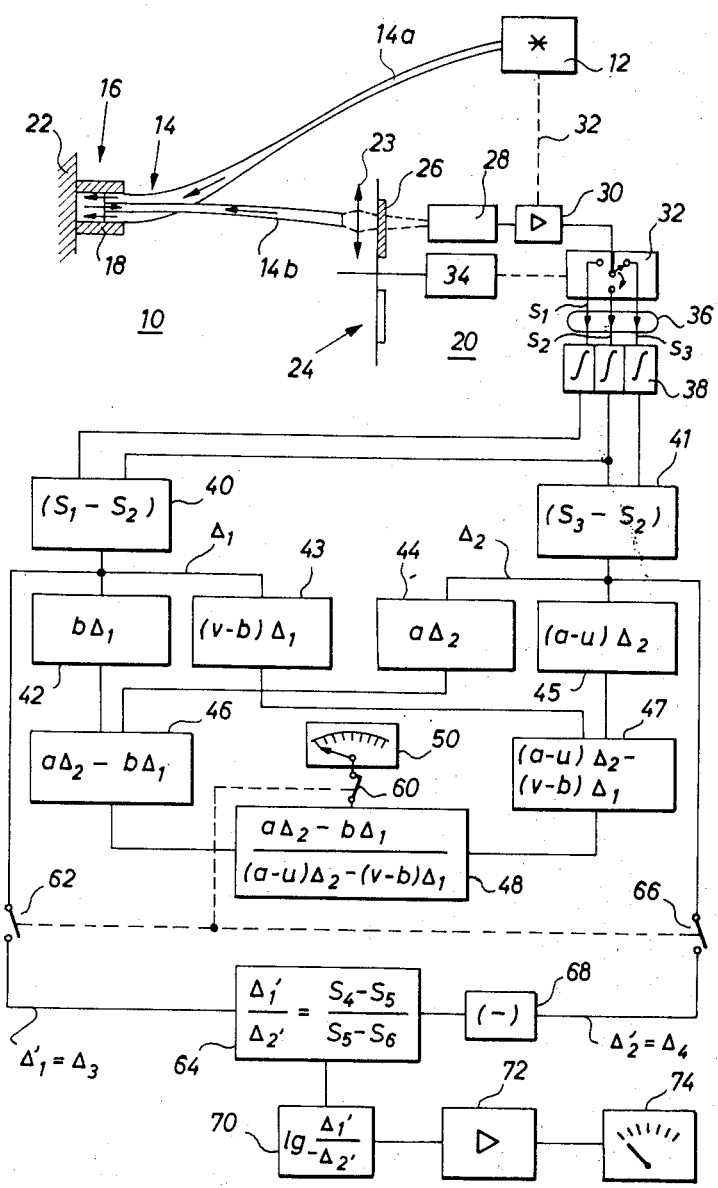

COMPUTING TYPE OPTICAL ABSORPTION MIXTURE ANALYZER

The present invention relates to apparatus for determining the proportional concentration of a given component in a mixture of substances by measuring the absorption of different wavelengths of a light beam in the mixture of substances, comprising a light source which supplies a beam incident upon the mixture of substances, a chromatic beam splitter which splits the beam in which the spectral energy distribution has been changed by the substance mixture (the "object beam") into three or more largely monochromatic spectral components, a photoelectric transducer for converting the different spectral fractions of the object beam into corresponding electrical signals, and electronic means for deriving from the electrical signals an output signal corresponding to the wanted concentration.

It has already been proposed to measure the changes that occur with time in biological processes and conditions, such as the degree of oxygenation of haemoglobin, by using a high-speed twin beam photometer in conjunction with an electronic digital computer (published thesis by R. Wodick, Marburg University, Germany, 1968).

The large amount of apparatus required is a drawback of this method.

Also known is a reflexion photometer for the intracardiac measurement of the degree of oxygen saturation of the blood. This method is based on the principle of measuring the relationship of the light intensities reflected by the blood at two different wavelengths, namely at 660 nm and 805 nm. The measuring beam is supplied by a light source and conducted to the measuring point by a glass fibre optical conductor in the form of a catheter, the light reflected by the blood which returns to the instrument through the same fibre optical conductor being resolved by interference filters into the desired spectral components (660 nm, 805 nm) and taken to an optical-electronic scanning and measuring instrument having a short time constant (Manufacturers' pamphlet; J. Appl. Physiol. 17:552, 1962).

It is also known that the interval between the two maxima of the spectral absorption curve of oxyhaemoglobin as well as the interval of two points of equal extinction of this, and other extinction spectra, are invariant to additive colour mixing (Naturwissenschaften 57, No. 1:42, 1970). The complications of the instrumentation required for measuring and evaluating extinction curves within major spectral ranges and in determining the maxima of extinction curves, as well as the poor precision of measurements limited to only two wavelengths when the distribution of the component that is to be measured, and/or the path length of the measuring beam in the examined substance mixture are unknown, are shortcomings of this state of the art. The last mentioned difficulty arises particularly when measuring living tissues, irrespective of whether the measurement is by reflected or transmitted light.

Hence the problem which underlies the present invention is that of providing apparatus for determining the proportional concentration of a given component in a mixture of substances, by a method which will give precise results even when the path taken by the measuring beam and/or the distribution of the wanted and of other components of the substance mixture are unknown.

SUBJECT MATTER OF THE PRESENT INVENTION

Briefly, light from a light source is subdivided simultaneously or sequentially into at least three largely monochromatic spectral fractions centered on wavelengths chosen for sensitivity to a particular component of the mixture being observed or to the relative concentration of two related components. The intensity of each of the spectral fractions is caused to produce three electrical signals ($S_1$, $S_2$ and $S_3$ respectively) which are then processed in electronic circuitry to determine an output signal ($g$) representative of concentration or relative concentration, in accordance with the following function $$g = [a\Delta_2 - b\Delta_1]/[(a-u)\Delta_2 + (v-b)\Delta_1]$$

wherein $a$, $b$, $u$ and $v$ are constants for the particular measurement relating to the material being determined and the frequencies chosen for observation, $\Delta_1$ is the difference ($S_1 - S_2$) between the electrical signals representing the spectral fractions respectively at a first and second of the three wavelengths ($\lambda_1$ and $\lambda_2$) and $\Delta_2$ is the difference ($S_3 - S_2$) between the electrical signals representing the spectral fractions respectively at the third wavelength and at one of the other two ($\lambda_3$ and $\lambda_2$).

The apparatus according to the invention is suitable more particularly for the determination by reflected light of the degree of oxygenation of blood — no sample being required — simply by applying a probe to the skin. Other applications include the determination of cytochromes and quite generally the determination of the proportional concentration of a specific component in a mixture of substances.

The invention may be put into practice in various ways but one specific embodiment will be described by way of example with reference to the accompanying drawing, which is a schematic diagram.

The apparatus 10 shown in the drawing comprises a light source 12, such as a xenon lamp, to which one end of a first bundle 14a of a glass fibre light guide 14 is attached. The other end of this bundle 14a of the fibre light guide has an annular face which is ground optically flat, and which is contained inside a measuring head 16 containing a spacing ring 18. Located concentrically within the annular end of the glass fibre optical conductor 14a is the end, likewise optically plane ground, of a second bundle 14b of fibre light guide which leads to an optico-electronic apparatus 20.

The measuring beam which emerges from the fibre light guide 14a is reflected by the substance mixture that is to be examined, say a biological tissue 22 to which the measuring head 16 has been applied, and the reflected rays pass through the fibre light guide 14b to the apparatus 20. In this apparatus the reflected light, which will be hereinafter referred to as the "object beam", is focused by a lens 23, through a revolving filter plate 24 containing several optical colour filters, particularly interference filters 26, on to a photomultiplier 28 which delivers its output to an amplifier 30.

The gain of the amplifier 30 may be controllable by a signal derived from the measuring beam for the purpose of compensating itensity fluctuations of the light source. The presence of this compensating connection, which may incidentally be replaced by some alternative means, is indicated in the drawing by a chain line 32.

The output of the amplifier 30 is connected to a preferably electronic switch 32, which is operated by or in synchronism with the motor which also drives the filter plate 24, and which so distributes the output signal of the amplifier 30 between three lines 36 that the signals $S_1$, $S_2$ and $S_3$ appearing in the three lines correspond to the intensities of the three spectral components of wavelengths $\lambda_1$, $\lambda_2$ and $\lambda_3$ into which the object beam has been separated by the colour filters 26.

Each of the three signals appearing in the outputs of the switch 32 is taken to an integrator 38 which integrates these signals over a given, preferably adjustably selectable, time for the purpose of improving the signal to noise ratio.

The signals $S_1$ and $S_2$ are then applied to a subtracting circuit 40 which forms the difference $\Delta_1 = (S_1 - S_2)$.

The signals $S_2$ and $S_3$ are applied to a second subtracting circuit 41 which forms the difference $\Delta_2 = (S_3 - S_2)$.

Each of the difference signals $\Delta_1$ and $\Delta_2$ is then each injected into one of two pairs of multipliers 42, 43 and 44, 45 in which they are multiplied by a preferably adjustable factor $a$ or $b$. These circuits 42 to 45 may consist of amplifiers or simply of potential dividers (potentiometers) which form part of the following circuits 46 or 47. The circuit 46 is again a subtracting stage in which the product of the difference signal $\Delta_1$ and its factor $b$ is subtracted from the product of the difference signal $\Delta_2$ and its factor $a$ to form a third difference signal $a\Delta_2 - b\Delta_1$. In the same way the product of the difference signal $\Delta_1$ and its factor $(v - b)$ is subtracted from the product of the difference signal $\Delta_2$ and its factor $(a - u)$ in a subtracting circuit 47 to give a fourth difference signal $(a - u)\Delta_2 - (v - b)\Delta_1$.

The difference signals obtained from the subtracting circuits 46 and 47 are applied to a dividing circuit 48 which divides the third difference signal obtained from the subtracting circuit 46 by the fourth difference signal obtained from the subtracting circuit 47. The quotient signal which appears in the output of the divider 48 is applied to an indicating instrument 50 which may be calibrated in units of concentration of the component that is to be measured. The indicated value does not depend upon the path length of the measuring rays in the tissue 22 nor does it depend upon inhomogeneities in the distribution of substances. This can be shown to be the case as follows:

Let the intensity $L(\lambda)$ of the object beam at the wavelength $\lambda$, after reflexion by or transmission through the specimen, consist of a fraction which varies with the concentration of the wanted component and a fraction which remains substantially constant at least during the period of measurement. For the examination of a blood-containing tissue by photometry, with which the invention is particularly concerned, the following relation will then hold $$L(\lambda) = L_0(k_1 10^{-E(\lambda)} + k_2 10^{-w}) \qquad 1.$$

In this equation
$L_0$ is the intensity of the incident measuring beam,
$k_1$ and $k_2$ are the variable and the constant fractions of the beam so that
$$k_1 + k_2 = 1 \qquad 2.$$

$w$ is the extinction of the constant fraction, $E(\lambda)$ is the extinction due to the oxygenated and deoxygenated haemoglobin, where
$$E(\lambda) = d \cdot c \cdot g \cdot \epsilon_o(\lambda) + d \cdot c(1 - g)\epsilon_d(\lambda) \qquad 3.$$

the meaning of the symbols being
$c$ the total concentration of the haemoglobin,
$d$ the thickness of the layer in which absorption has taken place,
$g$ the degree of oxygenation,
$\epsilon_o$ the molar coefficient of extinction of oxygenated haemoblobin, and
$\epsilon_d$ the molar coefficient of extinction of deoxygenated haemoglobin.

The three wavelengths $\lambda_1$, $\lambda_2$ and $\lambda_3$ are so chosen for the specific determination of the degree of oxygenation of haemoglobin that the molar extinction will vary as much as possible when the degree of oxygenation changes, whereas variations of the molar extinctions that do not depend upon the degree of oxygenation, i.e. the extinctions due to other components of the substance mixture, will be as small as possible. Let the proportions of the intensity of the object beam at the three wavelengths $\lambda_1$, $\lambda_2$ and $\lambda_3$ be $L(\lambda_1)$, $L(\lambda_2)$ and $L(\lambda_3)$, then, after introducing the following abbreviations $$a = \epsilon_d(\lambda_1) - \epsilon_d(\lambda_2) \qquad \text{4a – 4f.}$$
$$b = \epsilon_d(\lambda_3) - \epsilon_d(\lambda_2)$$
$$u = \epsilon_o(\lambda_1) - \epsilon_o(\lambda_2)$$
$$v = \epsilon_o(\lambda_3) - \epsilon_o(\lambda_2)$$
$$\Delta_1 = L(\lambda_1) - L(\lambda_2)$$
$$\Delta_2 = L(\lambda_3) - L(\lambda_2)$$

and assuming that
$$a \cdot c \cdot d \ll 1 \qquad \text{5a – 5d.}$$
$$b \cdot c \cdot d \ll 1$$
$$u \cdot c \cdot d \ll 1$$
$$v \cdot c \cdot d \ll 1$$

(relationships which can always be achieved by an appropriate choice of wavelengths), the following expression will hold for the degree of oxygenation $g$:

$$g = [a\Delta_2 - b\Delta_1]/[(a - u)\Delta_2 + (v - b)\Delta_1] \qquad 6.$$

This equation is set up in the apparatus described above with reference to the drawing, so that the indicating instrument 50 may be calibrated in terms of units of the degree of oxygenation $g$.

When the degree of oxygenation $g$ of the haemoglobin, i.e. the proportional concentration of oxyhaemoglobin has been determined in the above described manner, conclusions can be drawn with reference to the product of the concentration of the haemoglobin and the length of the light path through the sample (c.d.), even when the haemoglobin is inhomogeneously distributed. It follows from equations (1) and (3) that $$L(\lambda) = L_0(k_1 10^{-cd\epsilon_g} \times k_2 10^{-w} \qquad 7.$$

where $\epsilon_g(\lambda)$ is the molar coefficient of extinction that applies to a haemoglobin in which the degree of oxygenation is $g$.

Three wavelengths $\lambda_4$, $\lambda_5$ and $\lambda_6$ are now so chosen that the equation $$\epsilon_g(\lambda_5) = [\epsilon_g(\lambda_4) + \epsilon_g(\lambda_6)]/2 \qquad 8.$$

is satisfied.

The product of the light path $d$ and the colour concentration $c$ is then found to be $$c \cdot d = K \lg (\Delta_3/\Delta_4) \qquad 9.$$

wherein K is a constant characteristic of the system:

$$K = 1/[\epsilon_o(\lambda_5) - \epsilon_o(\lambda_4)] \qquad 10.$$

and $\Delta_3$ and $\Delta_4$ are the differences between the light intensities, viz:

$$\Delta_3 = L(\lambda_4) - L(\lambda_5) \qquad 11a,b.$$
$$\Delta_4 = L(\lambda_5) - L(\lambda_6)$$

It is thus possible to calculate the concentration $c$ if the length of the light path $d$ is known, or the length of the light path $d$ if the concentration $c$ is known.

The above described apparatus may be supplemented, as will be described below, to permit it to be used for calculating the product c·d according to equation (9).

Three additional filters which pass wavelengths $\lambda_4$, $\lambda_5$ and $\lambda_6$ are provided on the rotating filter plate 24. The filters for these wavelengths alternate with the filters for the wavelengths $\lambda_1$, $\lambda_2$ and $\lambda_3$. The synchronisation between the motor 34 and the switch 32 is so modified by the provision of a change-over switch that in its change-over position only signals corresponding to the wavelengths $\lambda_4$, $\lambda_5$ and $\lambda_6$ appear in the three lines 36. Moreover in the change-over position the instrument 50 is disconnected by a switch 60. Moreover, the output of the subtracting circuit 40 is connected by a switch 62 to one input of a divider 64 and the output of the subtracting circuit 41 is connected by a switch 66 to a sign reversing circuit 68 of which the output is connected to the other input of the divider 64. The latter circuit therefore produces the quotient $(\Delta'_1/-\Delta'_2) = (S_4 - S_5)/(S_5 - S_6)$, where $S_4$, $S_5$ and $S_6$ are electrical signals representing the intensities associated with the wavelengths $\lambda_4$, $\lambda_5$ and $\lambda_6$.

The quotient which appears as the output signal of the divider 64 is taken to a logarithm-forming circuit 70 and the output of the latter is directly connected via an amplifier 72 to an instrument 74 for indicating the product (c·d).

For a determination of the degree of oxygenation of haemoglobin the following wavelengths have been found to be suitable:

$\lambda_1 = 530$ nm
$\lambda_2 = 538$ nm
$\lambda_3 = 550$ nm

For a determination of the product c.d. in the living tissue of a warm-blooded animal the following wavelengths are suitable, for instance for 50 percent oxygenated spectra:

$\lambda_4 = 542$ nm
$\lambda_5 = 551$ nm
$\lambda_6 = 555$ nm

It will be understood that the invention is not intended to be limited to the measurement of the degree of oxygenation of haemoglobin or to the wavelengths that have been mentioned. It can be applied with advantage to many other purposes.

The described embodiment can be modified in a variety of ways. The filter plate may precede the object. Instead of a rotating filter plate 24 any other colour separating device may be used, which is capable of generating colour signals S in rotation or time-multiplexed fashion, or a static chromatic beam splitter could be used as employed for instance in colour television cameras and electronic printing plate producing machines. In such a case colour signals in parallel will be available and the switch 32 can be dispensed with. The several signals are preferably amplified in their various processing stages or in additional amplifiers not shown in the drawing to enable the operating circuits (subtracting circuits, dividing circuits etc.) to function within their optimal working ranges. Instead of working with reflected light, use can also be made of transmitted light. The colour filters are preferably easily exchangeable to permit the desired wavelength combinations to be conveniently provided.

While we have described above the principles of our invention in connection with specific apparatus, it is to be understood that this description is made only by way of example and not at a limitation of the scope of our invention as set forth in the objects thereof and in the accompanying claims.

What is claimed is:

1. Apparatus for determining the proportional concentration of a given component in a mixture of substances by measuring the absorption of different wavelengths of a light beam by the mixture of substances, comprising a light source which supplies a beam incident upon the mixture of substances, chromatic beam splitter means for separating the beam in which the spectral distribution of energy has been changed by the mixture (object beam) into at least three largely monochromatic spectral fractions grouped respectively about a corresponding number of selected wavelengths $(\lambda_1, \lambda_2, \lambda_3 \ldots)$, photoelectric transducer means for converting three of said different spectral fractions into corresponding electrical signals $(S_1, S_2, S_3)$, and electronic circuitry means for processing the electrical signals into an output signal corresponding to the wanted concentration, characterised in that the electronic processing circuitry derives an output signal (g) from said three electrical signals $(S_1, S_2, S_3)$, according to the following function $$g = [a\Delta_2 - b\Delta_1]/[(a - u)\Delta_2 + (v - b)\Delta_1]$$

wherein $a, b, u$ and $v$ are constants for the measurement relating to said given component and two of the three wavelengths, $\Delta_1$ is the difference $(S_1 - S_2)$ between the electrical signals representing the spectral fractions respectively of a first and second of said three wavelengths $(\lambda_1, \lambda_2)$ and $\Delta_2$ is the difference $(S_3 - S_2)$ between the electrical signals representing the spectral fractions respectively of the third and one of the other two of said wavelengths $(\lambda_3, \lambda_2)$.

2. Apparatus as claimed in claim 1 in which the wavelengths $\lambda_1, \lambda_2, \lambda_3$, into which the chromatic beam splitter separates the object beam, are so chosen that the extinction due to the concentration of the wanted component varies as much as possible, whereas the extinction due to other components of the substance mixture remains substantially constant during the measurement.

3. Apparatus as claimed in claim 1 for measuring the degree of oxygenation of blood, in which the constants $a, b, u$ and $v$ satisfy the equations:

$a = \epsilon_d(\lambda_1) - \epsilon_d(\lambda_2)$
$b = \epsilon_d(\lambda_3) - \epsilon_d(\lambda_2)$
$u = \epsilon_o(\lambda_1) - \epsilon_o(\lambda_2)$
$v = \epsilon_o(\lambda_3) - \epsilon_o(\lambda_2)$ where $\epsilon_d$ and $\epsilon_o$ are respectively the molar coefficients of extinction of oxygenated and deoxygenated haemoglobin at the wavelengths shown in brackets.

4. Apparatus as claimed in claim 3 in which each of the constants $a, b, u$ and $v$ is much less than $1/cd$, where $c$ is the total concentration of the haemoglobin and $d$ is the thickness of a layer in which absorption has taken place.

5. Apparatus according to claim 3, for measuring the degree of oxygenation of blood, characterised in that
$\lambda_1$=530 nm
$\lambda_2$=538 nm
$\lambda_3$=550 nm 6. Apparatus as claimed in claim 1, in which the electronic processing circuitry means contains two first difference circuits to which the electrical signals corresponding respectively to the first and second and to the third and second spectral fractions are applied, and which supply output signals ($\Delta_1$, $\Delta_2$) representing the differences between the said input signals; the outputs of the difference circuits are connected respectively to the inputs of two second difference circuits which supply further difference signals representing the differences between signals proportional to the first above difference signals ($\Delta_1$ and $\Delta_2$), and that the outputs of the latter difference circuits are connected to the inputs of a dividing circuit which produces an output signal representing the concentration $g$ of the wanted component.

7. Apparatus as claimed in claim 6, in which the beam splitter comprises a rotating filter plate, the electronic processing circuitry contains a switch for sequentially separating the electrical signals corresponding to the different spectral fractions, and integrating circuits are respectively interposed between the switch and said two first difference circuits.

8. Apparatus as claimed in claim 7, in which the outputs of the two first difference circuits are connected respectively to the inputs of the third and fourth difference circuits through circuits providing adjustable signal transfer ratios.

9. Apparatus as claimed in claim 1, in which the chromatic beam splitter provides three additional spectral fractions of the object beam, and the photoelectric transducer supplies three additional electrical signals ($S_4$, $S_5$, $S_6$) on a time sharing basis with respect to the aforesaid electrical signals ($S_1$, $S_2$, $S_3$) to the first two difference circuits and in which, further, there is provided additional electronic processing circuitry means to the input of which the output of said first two difference circuits is provided on said time sharing basis, said additional electronic processing circuitry means containing a second dividing circuit of which one input is connected as aforesaid to the output of the first difference circuit and the second input is connectable via a sign reversing circuit as aforesaid to the output of the second difference circuit, and containing also a logarithm-forming circuit the input of which is connected to the output of said second dividing circuit.

* * * * *